(12) United States Patent
Tan et al.

(10) Patent No.: US 11,756,333 B1
(45) Date of Patent: Sep. 12, 2023

(54) SYSTEMS AND METHODS FOR DETECTING POSTURES OF A USER OF AN IHS (INFORMATION HANDLING SYSTEM)

(71) Applicant: Dell Products, L.P., Round Rock, TX (US)

(72) Inventors: Loo Shing Tan, Singapore (SG); Seng Khoon Teh, Singapore (SG); Ruizhi Joyce Lu, Singapore (SG); Weixian Li, Singapore (SG)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/651,753

(22) Filed: Feb. 18, 2022

(51) Int. Cl.
*G06T 7/50* (2017.01)
*G06V 40/16* (2022.01)
*G06T 7/70* (2017.01)
*H04N 13/204* (2018.01)
*H04N 13/128* (2018.01)
*G01S 17/894* (2020.01)
*G01B 11/22* (2006.01)
*H04N 13/293* (2018.01)

(52) U.S. Cl.
CPC ............ *G06V 40/171* (2022.01); *G01B 11/22* (2013.01); *G01S 17/894* (2020.01); *G06T 7/50* (2017.01); *G06T 7/70* (2017.01); *H04N 13/128* (2018.05); *H04N 13/204* (2018.05); *H04N 13/293* (2018.05); *G06T 2200/04* (2013.01); *G06T 2207/10048* (2013.01); *G06T 2207/30201* (2013.01)

(58) Field of Classification Search
CPC ........... G06V 40/171; G06T 7/50; G06T 7/70; H04N 13/204; H04N 13/128; H04N 13/293; G01S 17/894
USPC .......................................................... 348/46
See application file for complete search history.

(56) References Cited

U.S. PATENT DOCUMENTS

2010/0149399 A1\* 6/2010 Mukai ................ H04N 21/4755
348/333.02

\* cited by examiner

Primary Examiner — Nguyen T Truong
(74) Attorney, Agent, or Firm — Fogarty LLP (57) ABSTRACT

Methods and systems are provided for determining a posture of a user of an Information Handling System (IHS). One or more cameras of the IHS are utilized to generate a two-dimensional image of the user as they operate the IHS. Landmarks that correspond to physical features of the user are identified through processing of the two-dimensional image generated using the cameras. A time-of-flight sensor of the IHS is utilized to generate a three-dimensional image of the user. The identified physical feature landmarks of the user are overlayed onto the three-dimensional image, thus allowing distances from the IHS to each of the landmarks to be determined. Based on the overlay of the physical feature landmarks onto the three-dimensional image a posture of the user relative to the IHS is determined. The posture may be scored based on the degree to which the user's posture deviates from an ergonomic posture.

20 Claims, 3 Drawing Sheets

SYSTEMS AND METHODS FOR DETECTING POSTURES OF A USER OF AN IHS (INFORMATION HANDLING SYSTEM)

FIELD

This disclosure relates generally to Information Handling Systems (IHSs), and more specifically, to supporting ergonomic use of IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs that are utilized for personal use, such personal computers, laptops, tablets, smartphones, etc., are increasingly likely to be regularly utilized for long intervals of time. Uninterrupted use of IHSs without breaks has been demonstrated to be potentially harmful, both physically and psychologically, to the user. For instance, users may experience physical side effects from regular and continued use of an IHS while physically positioned in non-ergonomic postures, such as while slouching in a chair.

SUMMARY

In various embodiments, Information Handling Systems (IHSs) may include: one or more processors; one or more cameras; a time-of-flight sensor; a memory device coupled to the one or more processors, the memory device storing computer-readable instructions that, upon execution by the one or more processors, cause the IHS to: utilize the one or more cameras of the IHS to generate a two-dimensional image of the user of the IHS; identify a plurality of physical feature landmarks of the user in the two-dimensional image generated using the one or more cameras; utilize the time-of-flight sensor of the IHS to generate a three-dimensional image of the user; overlay the physical feature landmarks of the user onto the three-dimensional image; and determine a posture of the user relative to the IHS based on the overlay of the physical feature landmarks onto the three-dimensional image.

In some IHS embodiments, the three-dimensional image of the user comprises a plurality of measurements of distances from locations on the body of the user to the IHS. In some IHS embodiments, overlaying the physical feature landmarks onto the three-dimensional image of the user provides a distance of the respective physical feature landmarks of the user from the IHS. In some IHS embodiments, the posture of the user is determined based on the respective distances of the physical feature landmarks from the IHS. In some IHS embodiments, the time-of-flight sensor comprises an infrared depth-mapping sensor. In some IHS embodiments, the physical feature landmarks comprise locations corresponding to at least one of the user's eyes, shoulders, mouth, nose, chin, and top of the user's head. In some IHS embodiments, further execution of instructions by the one or more processors causes the IHS to, based on the overlay the physical feature landmarks of the user onto the three-dimensional image, determine any anterior or posterior tilt of the user's head relative to the IHS. In some IHS embodiments, further execution of instructions by the one or more processors causes the IHS to, based on the overlay the physical feature landmarks of the user onto the three-dimensional image, determine any anterior or posterior tilt of the user's trunk relative to the IHS. In some IHS embodiments, further execution of instructions by the one or more processors causes the IHS to, based on the overlay the physical feature landmarks of the user onto the three-dimensional image, determine a degree of rotation of the user's body relative to the IHS. In some IHS embodiments, the degree of rotation of the user's body relative to the IHS is determined based on distances from the IHS to landmark physical features corresponding to each of the user's shoulders. In some IHS embodiments, further execution of instructions by the one or more processors causes the IHS to, based on the overlay the physical feature landmarks of the user onto the three-dimensional image, determine a lateral tilt of the user's trunk relative to the IHS. In some IHS embodiments, further execution of instructions by the one or more processors causes the IHS to, based on the overlay the physical feature landmarks of the user onto the three-dimensional image, determine a lateral tilt of the user's head relative to the IHS. In some IHS embodiments, further execution of instructions by the one or more processors causes the IHS to, generate an ergonomic risk score based on the determined posture of the user relative to the IHS. In some IHS embodiments, the risk score is tabulated using a Rapid Upper Limb Assessment (RULA) ergonomic scoring system.

In various additional embodiments, methods are provided for determining a posture of a user of an Information Handling System (IHS), the method comprising: utilizing one or more cameras of the IHS to generate a two-dimensional image of the user of the IHS; identifying a plurality of physical feature landmarks of the user in the two-dimensional image generated using the one or more cameras; utilizing a time-of-flight sensor of the IHS to generate a three-dimensional image of the user; overlaying the physical feature landmarks of the user onto the three-dimensional image; and determining a posture of the user relative to the IHS based on the overlay of the physical feature landmarks onto the three-dimensional image.

Some method embodiments may include generating an ergonomic risk score based on the determined posture of the user relative to the IHS. In some method embodiments, the risk score is tabulated using a Rapid Upper Limb Assessment (RULA) ergonomic scoring system.

In various additional embodiments, computer-readable storage devices may include instructions stored thereon for determining a posture of a user of an Information Handling System (IHS), wherein execution of the instructions by one or more processors of the IHS causes the one or more processors to: utilize one or more cameras of the IHS to generate a two-dimensional image of the user of the IHS; identify a plurality of physical feature landmarks of the user in the two-dimensional image generated using the one or more cameras; utilize a time-of-flight sensor of the IHS to generate a three-dimensional image of the user; overlay the physical feature landmarks of the user onto the three-dimensional image; and determine a posture of the user relative to the IHS based on the overlay of the physical feature landmarks onto the three-dimensional image.

In some storage device embodiments, the three-dimensional image of the user comprises a plurality of measurements of distances from locations on the body of the user to the IHS. In some storage device embodiments, the time-of-flight sensor of the IHS comprises an infrared depth-mapping sensor.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
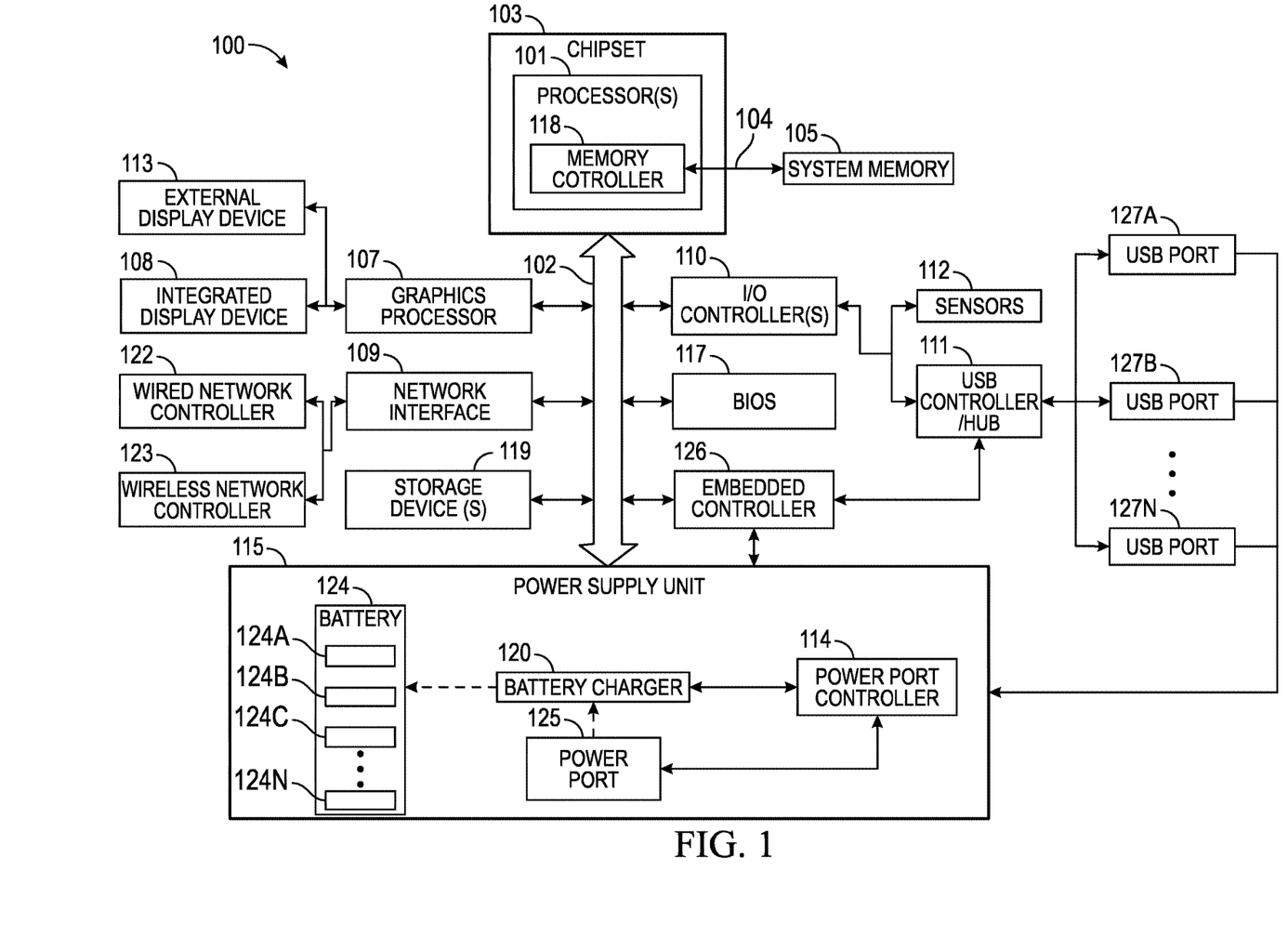
FIG. 1 is a block diagram depicting certain components of an IHS operable according to various embodiments for detecting physical postures of a user of the IHS.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

FIG. 1 is a block diagram depicting certain components of an IHS 100 operable according to various embodiments for detecting physical postures of a user of the IHS. As described in additional detail below, IHS 100 may include capabilities for identifying and evaluating the posture in which the user of IHS 100 is physically positioned relative to the IHS, where such determinations may be made based on data collected from various I/O capabilities supported by the IHS 100. In addition, embodiments may also utilize data collected by the IHS 100 to estimate levels of risk posed by identified postures of the user. In various embodiments, IHS 100 may include an embedded controller 126 that includes logic that executes program instructions, in conjunction with operations by components of power supply unit 115 and the operating system of IHS 100, to perform the operations disclosed herein for collecting data for use in detecting physical postures of a user of the IHS 100. While a single IHS 100 is illustrated in FIG. 1, IHS 100 may be a component of an enterprise system that may include any number of additional IHSs that may also be configured in the same or similar manner to IHS 100.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104. The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connected to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NICs), each of which may implement the hardware required for communicating via a specific networking technology, such as Wi-Fi, BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by applications of the operating system of IHS 100.

Chipset 103 may also provide access to one or more display device(s) 108, 113 via graphics processor 107. In certain embodiments, graphics processor 107 may be comprised within a video or graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. As illustrated, IHS 100 may support an integrated display device 108, such as a display integrated into a laptop, tablet, 2-in-1 convertible device, or mobile device. In some embodiments, IHS 100 may be a hybrid laptop computer that includes dual integrated displays incorporated in both of the laptop panels. IHS 100 may also support use of one or more external displays 113, such as external monitors that may be coupled to IHS 100 via various types of couplings.

In certain embodiments, chipset 103 may utilize one or more I/O controllers 110 that may each support hardware components such as user I/O devices and sensors 112. For instance, I/O controller 110 may provide access to one or more user I/O devices such as a keyboard, mouse, touchpad, touchscreen, microphone, speakers, camera and other input and output devices that may be coupled to IHS 100. Each of the supported user I/O devices may interface with the I/O controller 110 through wired or wireless connections. In some embodiments, the I/O devices that may be accessible by IHS 100 may include one or more cameras, that may be an integrated component of the IHS, or that may be an external device coupled to the IHS through a wired or wireless coupling. As described in additional detail below, embodiments may utilize one or more cameras of the IHS in identifying and evaluating the posture in which the user of IHS 100 is physically positioned relative to the IHS. In particular, two-dimensional images captured using the camera capabilities of the IHS may be used to identify and locate landmark features of a user, which may be used in determining the posture in which the user is currently positioned, relative to the IHS.

In certain embodiments, sensors 112 that may be accessed via I/O controllers 110 may provide access to data describing environmental and operating conditions of IHS 100. For instance, sensors 112 may include geo-location sensors capable for providing a geographic location for IHS 100, such as a GPS sensor or other location sensors configured to determine the location of IHS 100 based on triangulation and network information. Various additional sensors, such as optical, infrared and sonar sensors, that may provide support for xR (virtual, augmented, mixed reality) sessions hosted by the IHS 100. Such sensors 112 may capabilities for detecting when a user is detected within a certain proximity to IHS 100. For instance, sensors 112 may detect when a user is in close proximity to the IHS 100 and, in some cases, whether the user is facing the display(s) 108, 113.

In some embodiments, the sensors 112 that are accessible by IHS 100 may include depth sensors, such as time-of-flight sensors that may utilize infrared, or other imperceptible wavelengths of signal information, to determine the distance of objects from the IHS. In particular, these time-of-flight sensors may be used to measure the distance of the user from the IHS 100 at various different locations on the user. Using the distance information collected by the time-of-flight sensors, a three-dimensional image of the user may be constructed. By combining the two-dimensional images captured using the one or more cameras of the IHS 100 with the three-dimension information captured by the time-of-flight sensors, embodiments are able to estimate the distance from each the landmarks features of the user to the IHS. Using this distance information, embodiments determine a posture in which the user is physically positioned relative to the IHS.

As illustrated, I/O controllers 110 may include a USB controller 111 that, in some embodiments, may also implement functions of a USB hub. In some embodiments, USB controller 111 may be a dedicated microcontroller that is coupled to the motherboard of IHS 100. In other embodiments, USB controller 111 may be implemented as a function of another component, such as a component of a SoC (System on Chip) of IHS 100, embedded controller 126, processors 101 or of an operating system of IHS 100. USB controller 111 supports communications between IHS 100 and one or more USB devices coupled to IHS 100, whether the USB devices may be coupled to IHS 100 via wired or wireless connections. In some embodiments, a USB controller 111 may operate one or more USB drivers that detect the coupling of USB devices and/or power inputs to USB ports 127*a-n*. USB controller 111 may include drivers that implement functions for supporting communications between IHS 100 and coupled USB devices, where the USB drivers may support communications according to various USB protocols (e.g., USB 2.0, USB 3.0). In providing functions of a hub, USB controller 111 may support concurrent couplings by multiple USB devices via one or more USB ports 127*a-n* supported by IHS 100.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. In some embodiments, BIOS 117 may be implemented using a dedicated microcontroller coupled to the motherboard of IHS 100. In some embodiments, BIOS 117 may be implemented as operations of embedded controller 126. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Some IHS 100 embodiments may utilize an embedded controller 126 that may be a motherboard component of IHS 100 and may include one or more logic units. In certain embodiments, embedded controller 126 may operate from a separate power plane from the main processors 101, and thus from the operating system functions of IHS 100. In some embodiments, firmware instructions utilized by embedded controller 126 may be used to operate a secure execution environment that may include operations for providing various core functions of IHS 100, such as power management and management of certain operating modes of IHS 100.

Embedded controller 126 may also implement operations for interfacing with a power supply unit 115 in managing power for IHS 100. In certain instances, the operations of embedded controller may determine the power status of IHS 100, such as whether IHS 100 is operating strictly from battery power, whether any charging inputs are being received by power supply unit 115, and/or the appropriate mode for charging the one or more battery cells 124*a-n* using the available charging inputs. Embedded controller 126 may support routing and use of power inputs received via a USB port 127*a-n* and/or via a power port 125 supported by the power supply unit 115. In addition, operations of embedded controller 126 may interoperate with power supply unit 115 in order to provide battery status information, such as the charge level of the cells 124*a-n* of battery 124. In some embodiments, power status information collected by embedded controller 126 may be utilized in determining whether to operate user activity monitoring procedures, where the monitoring of user activity is used to determine when the user is actively operating the IHS 100 and when the user has taken a break from operating the IHS.

In some embodiments, embedded controller 126 may also interface with power supply unit 115 in monitoring the battery state of battery 124, such as the relative state of charge of battery 124, where this charge level of the battery 124 may be specified as a percentage of the full charge capacity of the battery 124. In some instance, when operating from power stored in battery system 124, embedded controller 126 may detect when the voltage of the battery system 124 drops below a low-voltage threshold. When the charge level of battery 124 drops below such a low-voltage threshold, embedded controller 126 may transition the IHS to an off-power state in implementing a battery protection mode that preserves a minimal power level in battery 124.

Embedded controller 126 may also implement operations for detecting certain changes to the physical configuration of IHS 100 and managing the modes corresponding to different physical configurations of IHS 100. For instance, where IHS 100 is a laptop computer or a convertible laptop computer, embedded controller 126 may receive inputs from a lid position sensor that may detect whether the two sides of the laptop have been latched together, such that the IHS is in a closed position. In response to lid position sensor detecting latching of the lid of IHS 100, embedded controller 126 may initiate operations for shutting down IHS 100 or placing IHS 100 in a low-power mode. In this manner, IHS 100 may support the use of various power modes. In some embodiments, the power modes of IHS 100 may be implemented through operations of the embedded controller 126 and power supply unit 115.

As described, IHS 100 may also include a power supply unit 115 that receives power inputs used for charging batteries 124 from which the IHS 100 operates. IHS 100 may include a power port 125 to which an AC adapter may be coupled to provide IHS 100 with a supply of DC power. The DC power input received at power port 125 may be utilized by a battery charger 120 for recharging one or more internal batteries 124 of IHS 100. As illustrated, batteries 124 utilized by IHS 100 may include one or more cells 124*a-n* that may connected in series or in parallel. Power supply unit 115 may support various modes for charging the cells 124*a-n* of battery 124 based on the power supply available to IHS 100 and based on the charge levels of the battery system 124. In certain embodiments, power supply unit 115 of IHS 100 may include a power port controller 114 that is operable for configuring operations by power port 125.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
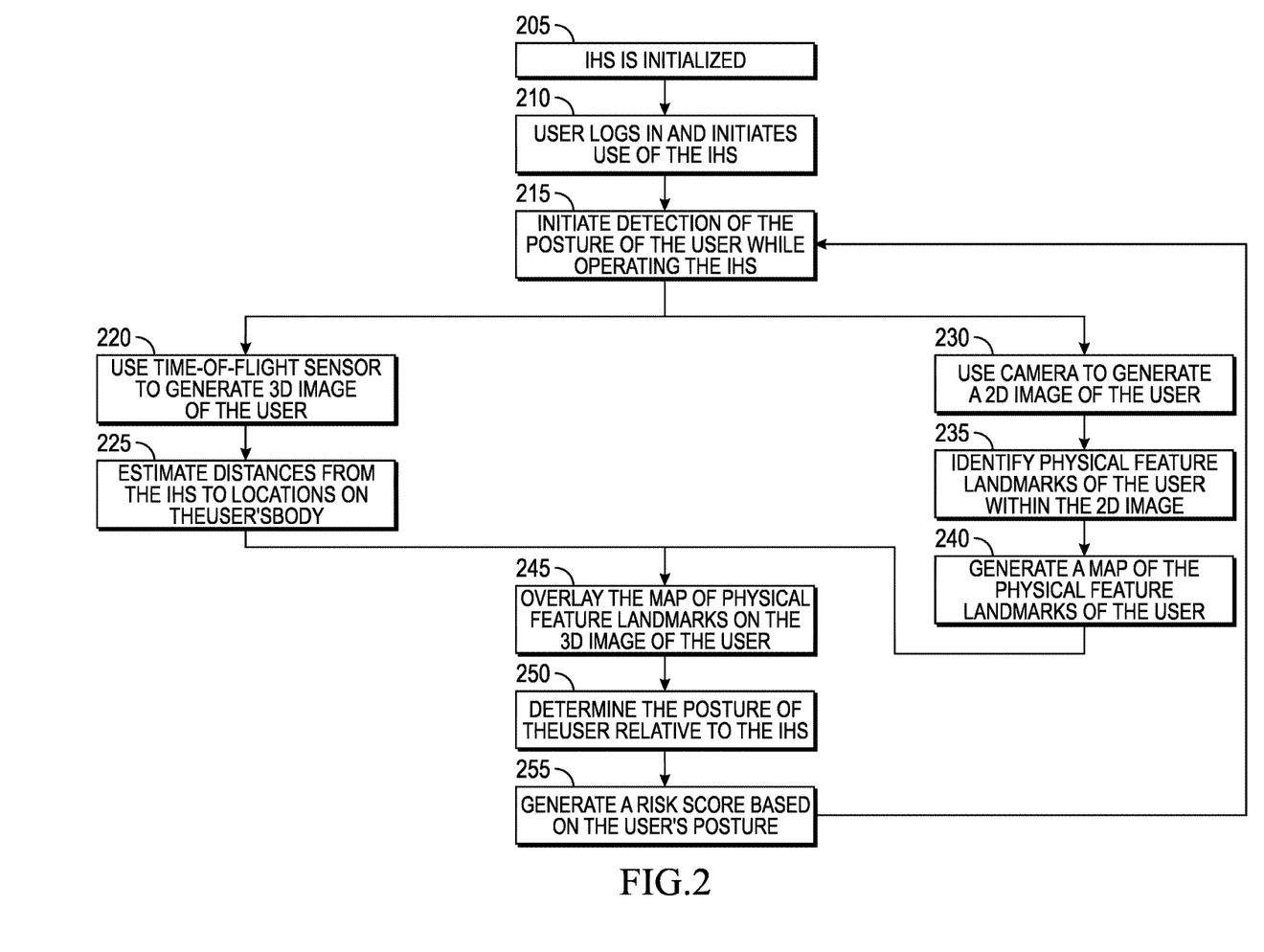
FIG. 2 is a flow chart diagram illustrating certain steps of a process according to various embodiments for detecting physical postures of a user of an IHS.

FIG. 2 is a flow chart diagram illustrating certain steps of a process according to various embodiments for detecting physical postures of a user of an IHS. As illustrated, embodiments may begin at block 205 with the initialization of an IHS, such as the IHS described with regard to FIG. 1, that includes two-dimensional and three-dimensional imaging capabilities. Once the IHS has been initialized and the operating system of the IHS is booted, at 210, the user may login to the IHS and/or operating system and may commence operation of the IHS through use of software applications that are supported by the operating system of the IHS. The user will typically operate the IHS while facing an integrated display of the IHS, or in some cases an external display the is coupled to the IHS. The physical characteristics in which the user holds their body while operating the IHS may be referred to as the user's posture. Postures that are considered ergonomic are those in which the user is aligned and positioned relative to the IHS such that the user's body is not unnecessarily strained. As described, operating an IHS for prolonged periods of time while positioned in non-ergonomic postures may result in the user experience a variety of physical symptoms.

Upon operation of the IHS being initiated, at 215, embodiments initiate detection of the physical posture of the user relative to the IHS. Some embodiments may initiate posture detection at periodic intervals during the ongoing operation of the IHS. For instance, embodiments may determine the posture of the user of the IHS at regular and configurable intervals, such as every minute. Embodiments may additionally or alternatively initiate posture detection upon certain conditions, such as in response to detecting a lack of movement and/or activity by the user for over a certain duration of time. As described in additional detail below, embodiments may generate a risk score based on the detected posture of the user, where the risk score quantifies the risk of physical side effects for particular non-ergonomic postures. In such embodiments, embodiments may initiate posture detection procedures more regularly as the risk scores for the user's posture increase. As such, embodiments may detect postures more frequently for users with poor ergonomics.

Figure 3:
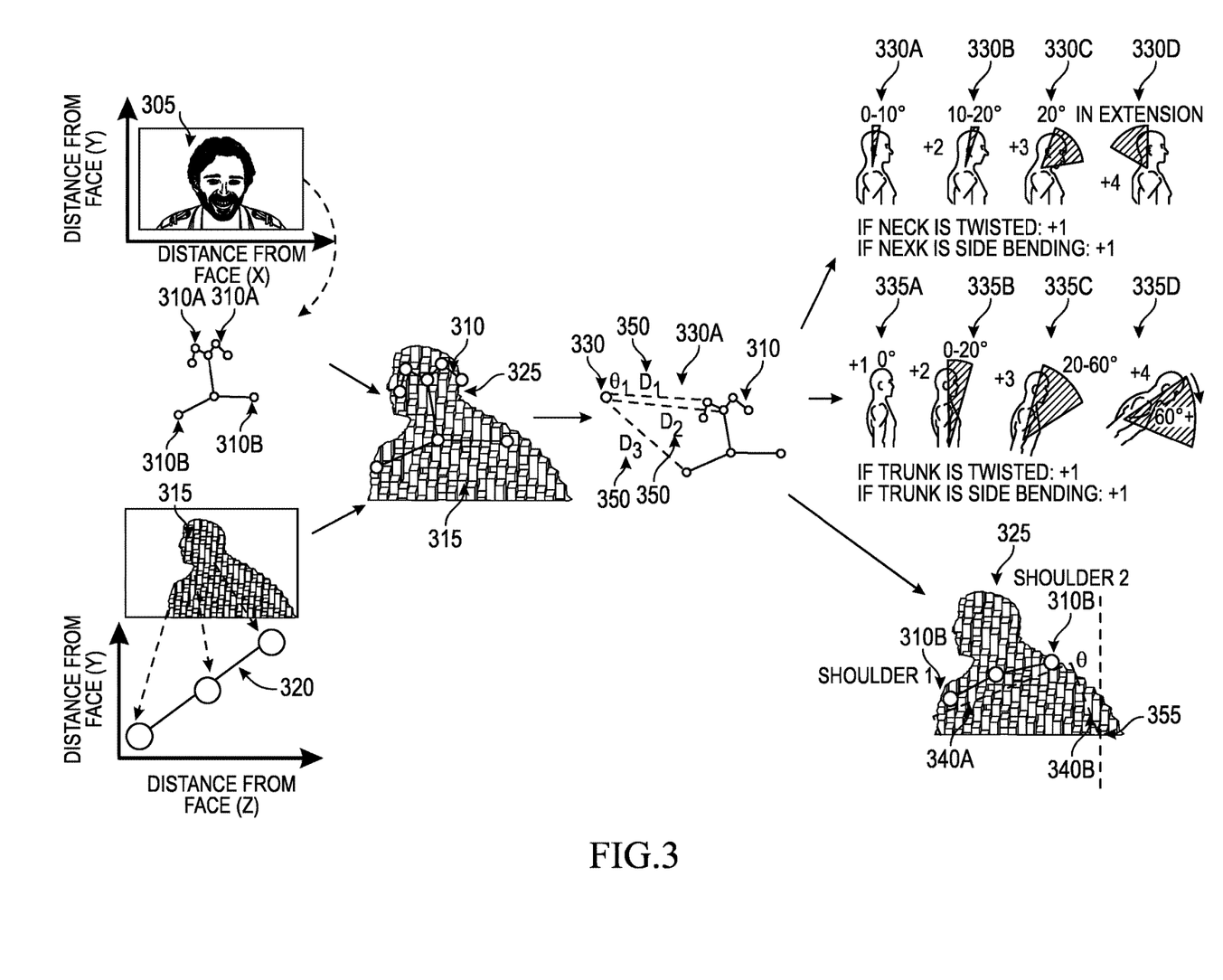
FIG. 3 is a flow chart diagram illustrating additional steps of a process according to various embodiments for detecting physical postures of a user of an IHS.

As indicated in FIG. 2, upon initiating posture detection procedures, embodiments initiate generation of a two-dimensional image of the user and also initiate generation of a separate three-dimensional image of the user. Aspects of this bifurcated process for posture detection are illustrated in FIG. 3. With regard to the two-dimensional image, as described with regard to FIG. 1, an IHS according to embodiments includes one or more external and/or integrated cameras that are capable of capturing images, as well as capturing video in most circumstances. An IHS may include multiple integrated cameras, but typically includes at least one camera that is positioned to capture images of the user's face as they are using the IHS, under typical operating circumstances. External cameras may be located without restriction relative to the IHS, but will typically include a camera similarly positioned to capture the user's face as they are using the IHS.

At 230, such camera capabilities of the IHS are used to capture a two-dimensional image, with the camera settings of the IHS configured to focus the camera on the user that is positioned at their expected location while operating the IHS, such as facing the display screen of the IHS from approximately an arms-length distance from the display screen, as illustrated in image 305 of FIG. 3. In this manner, the camera capabilities of the IHS may be used to capture an image 305 of the user as they face the display of the IHS as they operate the IHS. Using standard image processing capabilities, the captured image may then be processed in order to isolate the user from the rest of the image, and in particular to isolate the user from the background behind the user and from any surfaces in front of the user, such as from a desk or table.

At 235 and as indicated in FIG. 3, the captured two-dimensional image 305 is processed in order to locate physical features on the user's body that correspond to landmarks 310 that are usable for determine the position of the user's body, and in particular the user's head and trunk, relative to the IHS. For instance, physical features that may be utilized as landmarks may include features such as the user's eyes, the user's mouth, the user's chin, the user's cheekbones, the top of the user's head, each side of the user's head, locations on the user's shoulders and/or the base of the user's neck. In the set of landmarks 310 of FIG. 3, landmarks 310a may correspond to the location of the user's eyes and landmarks 310b may correspond to the location of the ends of each of the user's shoulders.

In some instances, embodiments may rely on biometric image processing capabilities that are available to the IHS in order to identify such physical feature landmarks 310 in the captured image 305 of the user. In such embodiments, the landmark features 310 of the user may be identified using a library of biometric prints of the user, where the biometric prints may specify the relative locations of the landmark features of the user, when the user is at a certain distance and orientation relative to the IHS. At 240, embodiments may generate a map of the identified landmarks features of the user, such as illustrated map of landmarks 310 of FIG. 3, where the map may include the locations of each of the physical landmarks on a coordinate plane, which may correspond to a vertical plane of the user.

As indicated in both FIGS. 2 and 3, in addition to capturing a two-dimensional image 310 of the user, at 220, a three-dimensional image 315 of the user is also captured. For instance, a depth-sensing capability of the IHS, such as an infrared time-of-flight sensor, may be used to generate a three-dimensional representation 315 of the user as they operate the IHS. In some instances, the two-dimensional image 305 and the three-dimension image 315 may be collected in the reverse order from this description and may be collected in parallel when the IHs supports such capabilities.

In some instances, the three-dimensional image 315 of the user as they operate the IHS may be generated by the time-of-flight sensor by broadcasting patterns of infrared signals that are each used to measure the distance from a point on the user's body to the sensor, and thus providing a measurement of the distance of particular points on the user's body to the IHS. The generated three-dimensional image 315 of the user is constructed from these time-of-flight measurements, thus providing an estimate of the distance between the IHS and different parts of the user's body that are visible to the time-of-flight sensor. As with the captured two-dimensional image 305, the three-dimensional image 315 may be similarly processed in order to isolate the user from the background and foreground that is also captured.

As indicated in FIG. 3, in some embodiments, the relative distances between the different parts of the user's body may be determined, at 225, through a regression analysis 320 of the measurements collected by the time-of-flight sensor. Embodiments may annotate this three-dimensional image with the distance measurements that are estimated for specific points on the user's body and for general areas or portions of the user's body, such as for the user's truck and for areas where landmark physical features of the user are expected to be found. In addition, the regression analysis may be further utilized to estimate distances from the IHS to portions of the user's body that are obscured, such as from a portion of the user's trunk that is below the surface of a desk where the user is seated, or where the user head is partially outside of the captured image 305.

Once both the three-dimensional image 315 of the user has been captured and annotated with distances from the IHS and when the landmark features 310 have been identified within the two-dimensional image 305 of the user, at 245, the set of landmarks 310 is overlayed 325 onto the three-dimensional image 315, as illustrated in FIG. 3. In some embodiments, the landmark features 310 may be located on the three-dimensional image 315 to generate the overly 325 using machine learning capabilities that may be trained using a series of two-dimensional and three-dimensional images of the user that are generated in a controlled environment and with the user positioned at pre-defined positions, such as sitting directly facing the IHS at a known distance and such as sitting at a specific degree of rotation relative to the IHS (e.g., with the user looking fifteen degrees to the right of the display of the IHS), and such as sitting at a specific incline relative to the IHS (e.g., with the user bent forward thirty degrees towards the IHS).

As indicated in FIG. 3, through the use of this overlay 325 of landmark physical features of the user's body onto the three-dimensional image, distances 350 from the IHS 330 to the landmark features 310 of the user's body are determined. For instance, distances may be determined such as the distance d1 from the IHS 330 to the landmark corresponding to the user's right eye, and such as distance d2 from the IHS 330 to the landmark corresponding to the user's nose, and such as distance d3 from the IHS 300 to each the user's right shoulder. In this manner, distances from the IHS 330 to each of the landmarks physical features of the user may be determined. Also as indicated in FIG. 3, angles, such as angle el from the IHS to the landmark corresponding to the user's right eye, may also be determined and recorded for use in determining the posture of the user.

Based on the distance and angle measurements calculated from the overly 325 of the landmarks 310 on the three-dimensional image 315, at 250, embodiments determine a posture of the user relative to the IHS. In some embodiments, the posture of the user may be determined based on the degree to which the user's head and trunk are inclined or declined relative to the IHS, and further based on the degree of rotation of the user relative to the IHS, and further based on the degree to which the user is leaning laterally away from a vertical centerline of the display of the IHS.

Accordingly, as illustrated in FIG. 3, four possible positions 330a-d of the user's head may be determined, where these positions determine the degree to which the user's head is inclined towards the display of the IHS or reclined away from the IHS. For instance, in head position 330a, the user's head is inclined from zero to ten degrees towards the IHS, where the degree of incline may be relative to the plane corresponding to the display screen of the IHS. In head position 330b, the user's head is inclined from ten to twenty degrees towards the IHS. In head position 330c, the user's head is inclined greater than twenty degrees towards the IHS. In head position 330d, the user's head is declined away from the IHS. Such determinations may be made from the calculated distances determined from the overlay 325 of the landmarks on the three-dimensional image of the user. For instance, the distance from the IHS to the user's chin provides an indication of the degree of tilt of the user's head. Embodiments may utilize machine learning models trained with a series of pre-defined images captured in controlled environment, such as described above, in order to classify the head position 330a-d of the user from the landmark locations and calculated landmark distances.

In this same manner, four possible positions 335a-d of the user's trunk may be determined, where these positions determine the degree to which the user's trunk is inclined towards the display of the IHS or reclined away from the IHS. For instance, in trunk position 335a, the user's trunk is neutral relative to the IHS. In trunk position 335b, the user's trunk is inclined up to twenty degrees towards the IHS. In trunk position 335c, the user's head is inclined from twenty to sixty degrees towards the IHS. In trunk position 335d, the user's trunk is inclined more than twenty degrees towards the IHS. As above, such determinations may be made from the calculated distances determined from the overlay 325 of the landmarks on the three-dimensional image of the user. For instance, distances from the IHS to different points on the user's trunk may provide an indication of the degree to which the user's trunk is tilted towards the IHS. As before, embodiments may utilize machine learning models trained with a series of pre-defined images captured in controlled environment to classify the trunk position 335a-d of the user from the landmark locations and calculated landmark distances.

As indicated in FIG. 3, posture determinations may also be based on the degree to which the user is leaning to either side of the IHS, such as from a vertical centerline of the display of the IHS. For instance, in FIG. 3, the degree to which the trunk of the user is leaning away from a vertical axis 355 may be determined from the landmark information. For instance, the different heights of the shoulder landmarks 310b may be compared to determine a degree of horizontal tilt 340a of the user's trunk, which also provides a degree of vertical tilt 340b of the user's trunk. In this same manner, the location of the landmarks corresponding to the user's eyes may be compared to determine a degree of vertical tilt of the user's head.

As described, the posture of the user of the IHS may also be determined based on the degree of rotation of the user relative to the IHS. From the calculated distance measurements for the landmarks, embodiments may determine the difference in distances between corresponding landmarks in order to determine the degree to which the user is rotated relative to the IHS. For instance, the degree of rotation of the user's trunk may be determined based on the difference between the distances from the IHS to landmarks corresponding to each of the user's shoulders. Similarly, the degree of rotation of the user's head may be determined based on the difference between the distances from the IHS to landmarks corresponding to each of the user's eyes or cheekbones.

In some embodiments, the determined posture of the IHS may be used to generate a posture risk score, where the risk score quantifies the degree to which the user's current posture deviates from an ideal ergonomic posture for the user relative to the IHS. As described, the posture of the user may be determined based on the degree to which the user's head and/or trunk are inclined towards or declined away from the display of the IHS, the further based on the degree to which the user is leaning to one side and the degree to which the users head and/or trunk are twisted relative to the IHS. These characteristics of the user's posture may be used to generate the posture risk score.

In some embodiments, each of these characteristics of the user's posture may be used to generate a risk score based on the Rapid Upper Limb Assessment (RULA) scoring methodology that provides a quantified ergonomic risk for an individual's body position when performing a specific task. By calculating a RULA score for the postures in which the user operates the IHS, embodiments are able to track the progress or degradation of the user's posture over time. In some embodiments, the risk score may be based on the degree to which the user's head is inclined towards or declined from the IHS. As illustrated in FIG. 3, the neutral or near neutral amount of head tilt of position 330a does not add to the risk score, while position 330b with a ten to twenty decree incline towards the IHS adds two points to the risk score. Position 330c with a greater than twenty-degree incline adds three points to the risk score and position 330d with a declined head position adds four points to the risk score. In this same manner, the neutral trunk position 335a adds a single point to the risk score, while position 335b with up to a twenty-decree incline of the trunk towards the IHS adds two points to the risk score. Position 335c with a twenty to sixty degree trunk incline adds three points to the risk score and position 335d with a greater than sixty degree inclined trunk position adds four points to the risk score. As indicated in FIG. 3, the risk score may increase by one if the head is twisted relative to the IHS and increased by one if the trunk is twisted. The risk score is increased by one of the head is leaning relative to the IHS and increased by one if the user's trunk is leaning. In this manner, the risk of physical side effects from non-ergonomic aspects of the user's posture may be determined and quantified in manner that can be used to provide the user with alerts and instructions for improving the ergonomics of their posture as they operate the IHS.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
   one or more processors;
   one or more cameras;
   a time-of-flight sensor;
   a memory device coupled to the one or more processors, the memory device storing computer-readable instructions that, upon execution by the one or more processors, cause the IHS to:
   utilize the one or more cameras of the IHS to generate a two-dimensional image of the user of the IHS;
   identify a plurality of physical feature landmarks of the user in the two-dimensional image generated using the one or more cameras;
   utilize the time-of-flight sensor of the IHS to generate a three-dimensional image of the user;
   overlay the physical feature landmarks of the user onto the three-dimensional image; and
   determine a posture of the user relative to the IHS based on the overlay of the physical feature landmarks onto the three-dimensional image.

2. The IHS of claim 1, wherein the three-dimensional image of the user comprises a plurality of measurements of distances from locations on the body of the user to the IHS.

3. The IHS of claim 2, wherein overlaying the physical feature landmarks onto the three-dimensional image of the user provides a distance of the respective physical feature landmarks of the user from the IHS.

4. The IHS of claim 3, wherein the posture of the user is determined based on the respective distances of the physical feature landmarks from the IHS.

5. The IHS of claim 1, wherein the time-of-flight sensor comprises an infrared depth-mapping sensor.

6. The IHS of claim 1, wherein the physical feature landmarks comprise locations corresponding to at least one of the user's eyes, shoulders, mouth, nose, chin, and top of the user's head.

7. The IHS of claim 1, wherein further execution of instructions by the one or more processors causes the IHS to:
   based on the overlay the physical feature landmarks of the user onto the three-dimensional image, determine any anterior or posterior tilt of the user's head relative to the IHS.

8. The IHS of claim 1, wherein further execution of instructions by the one or more processors causes the IHS to:
   based on the overlay the physical feature landmarks of the user onto the three-dimensional image, determine any anterior or posterior tilt of the user's trunk relative to the IHS.

9. The IHS of claim 1, wherein further execution of instructions by the one or more processors causes the IHS to:
   based on the overlay the physical feature landmarks of the user onto the three-dimensional image, determine a degree of rotation of the user's body relative to the IHS.

10. The IHS of claim 9, wherein the degree of rotation of the user's body relative to the IHS is determined based on distances from the IHS to landmark physical features corresponding to each of the user's shoulders.

11. The IHS of claim 1, wherein further execution of instructions by the one or more processors causes the IHS to:
    based on the overlay the physical feature landmarks of the user onto the three-dimensional image, determine a lateral tilt of the user's trunk relative to the IHS.

12. The IHS of claim 1, wherein further execution of instructions by the one or more processors causes the IHS to:
    based on the overlay the physical feature landmarks of the user onto the three-dimensional image, determine a lateral tilt of the user's head relative to the IHS.

13. The IHS of claim 1, wherein further execution of instructions by the one or more processors causes the IHS to:
    generate an ergonomic risk score based on the determined posture of the user relative to the IHS.

14. The IHS of claim 1, wherein the risk score is tabulated using a Rapid Upper Limb Assessment (RULA) ergonomic scoring system.

15. A method for determining a posture of a user of an Information Handling System (IHS), the method comprising:

utilizing one or more cameras of the IHS to generate a two-dimensional image of the user of the IHS;

identifying a plurality of physical feature landmarks of the user in the two-dimensional image generated using the one or more cameras;

utilizing a time-of-flight sensor of the IHS to generate a three-dimensional image of the user;

overlaying the physical feature landmarks of the user onto the three-dimensional image; and determining a posture of the user relative to the IHS based on the overlay of the physical feature landmarks onto the three-dimensional image.

16. The method of claim 15, further comprising: generating an ergonomic risk score based on the determined posture of the user relative to the IHS.

17. The method of claim 16, wherein the risk score is tabulated using a Rapid Upper Limb Assessment (RULA) ergonomic scoring system.

18. A non-transitory computer-readable storage device having instructions stored thereon for determining a posture of a user of an Information Handling System (IHS), wherein execution of the instructions by one or more processors of the IHS causes the one or more processors to:

utilize one or more cameras of the IHS to generate a two-dimensional image of the user of the IHS;

identify a plurality of physical feature landmarks of the user in the two-dimensional image generated using the one or more cameras;

utilize a time-of-flight sensor of the IHS to generate a three-dimensional image of the user;

overlay the physical feature landmarks of the user onto the three-dimensional image; and determine a posture of the user relative to the IHS based on the overlay of the physical feature landmarks onto the three-dimensional image.

19. The non-transitory computer-readable storage device of claim 18, wherein the three-dimensional image of the user comprises a plurality of measurements of distances from locations on the body of the user to the IHS.

20. The non-transitory computer-readable storage device of claim 18, wherein the time-of-flight sensor of the IHS comprises an infrared depth-mapping sensor.

* * * * *